Patented Feb. 25, 1941

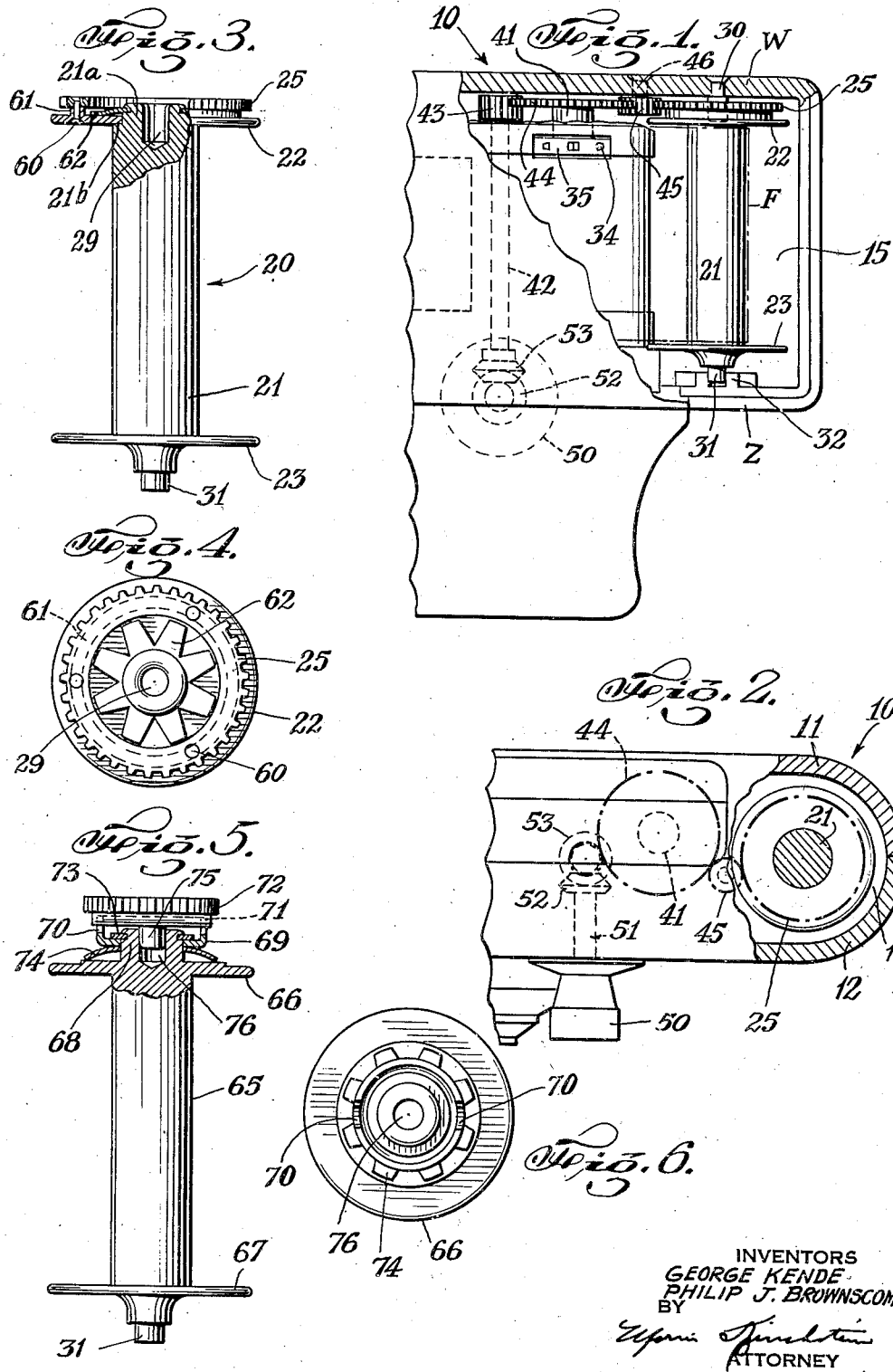

2,233,389

UNITED STATES PATENT OFFICE 2,233,389

FILM SPOOL FOR CAMERAS

George Kende, New York, N. Y., and Philip J. Brownscombe, East Orange, N. J., assignors to Universal Camera Corporation, New York, N. Y., a corporation of Delaware Application April 25, 1938, Serial No. 204,103

5 Claims. (Cl. 242—71)

This invention relates to cameras. More particularly, this invention relates to an improved film spool construction for use in cameras.

One of the objects of our invention is to provide a novel construction of a film spool comprising driving means for rotating the same to cause the take up or rewinding of a film which has been fed thereto by a sprocket after each exposure, together with means to permit slipping action between said driving means and the film spool upon which it is mounted.

Another object of our invention is to provide a novel film spool construction provided with slip friction drive means to compensate for the increasing core diameter of the spool due to the convolutions of film which are rewound thereon, and adapted for use in a camera having a chain of gearing between the sprocket and the film spool, in which chain of gearing there is no friction slipping action provided.

Still another object of our invention is to provide an improved film spool construction of the character described which shall comprise relatively few and simple parts, which shall be easy to assemble, which shall be relatively inexpensive to manufacture, which shall be simple to mount in operative position and readily removed, and which at the same time shall be highly efficient for the purposes intended.

Other objects of this invention will in part be obvious and in part hereinafter pointed out.

Certain features described but not claimed in this application are described and claimed in my co-pending application Serial No. 204,102, filed simultaneously herewith.

The invention accordingly consists in the features of construction, combinations of elements, and arrangement of parts which will be exemplified in the construction hereinafter described, and of which the scope of application will be indicated in the claims.

In the accompanying drawing, in which is shown one of the various possible embodiments of this invention:

Fig. 1 is a fragmentary view of a camera casing with a film spool, constructed in accordance with our invention, mounted therein;

Fig. 2 is a top plan view, partly sectional, of the portion of the camera illustrated in Fig. 1;

Fig. 3 is an enlarged elevational view, partly sectional, of the film spool shown in Fig. 1;

Fig. 4 is an end elevational view thereof;

Fig. 5 is a view similar to Fig. 3 but illustrating a modified form of our invention; and Fig. 6 is an end elevational view thereof with the gear removed.

Referring now in detail to the drawing, there is disclosed a portion of a camera 10 comprising the casing parts 11 and 12, which when in assembled relationship form the film spool chambers 15. Mounted in one of the film chambers 15 is a take-up or rewind film spool 20, constructed in accordance with our invention and which may comprise a core portion 21 around which a film is adapted to be wound, and a pair of flanges 22 and 23 attached to the core.

In certain types of cameras, such as for example, the type illustrated in Figs. 1 and 2 of the drawing, a perforated film F is employed. The film F is moved by a suitable film sprocket 35 having sprocket projections 34 which engage in the perforations of the film F to advance the same. The sprocket 35 may be turned by a hand knob 50 disposed outside of the camera casing and connected to the sprocket 35 by suitable gearing. One such form of interconnecting gearing mechanism comprises a pair of bevel gears 52 and 53, the gear 52 being fixed to the knob shaft 51, while the gear 53 is fixed to a rotatably mounted shaft 42 having also fixed at one end thereof for rotation therewith a gear 43. The said gear 43 is adapted to mesh with a gear 44 integrally mounted on the sprocket wheel shaft 41, to turn said shaft and sprocket 35. The camera, as illustrated in the drawing, is of the type which is so designed that the hand knob 50 can only be turned a predetermined amount, such amount being slightly more than sufficient to advance the film for one exposure. The camera may be so designed that the turning of the knob 50 also acts so as to wind the shutter, thus conditioning the camera for exposure. After the exposure has been made, the hand knob is again free to turn the same amount as before, the cycle being thus repeated, as clearly disclosed and described in our co-pending application Serial No. 177,884, filed December 3, 1937.

In order to provide a uniform take up or rewind of the film F after it has been fed through by the sprocket 35, the following construction is provided. One of the flanges of the spool 20 such as, for example, the flange 22 is not rigidly fixed to the core 21 but is relatively rotatably mounted thereon. The core 21 is provided with a reduced portion 21a forming a shoulder 21b. The flange 22 is designed to fit on the extension 21a so as to rest against the shoulder 21b, and is mounted so as to be relatively rotatable with respect to the core 21. Fixedly attached to the flange 22 by any suitable attaching means, such as the rivets 60, is a gear 25, and said gear being preferably spaced from the flange 22 by means of an annular projection 61 which may be integral with the flange 22. The gear 25 is so designed that when the spool 20 is mounted in the camera as shown in Figs. 1 and 2, it will be in mesh with an intermediate gear 45, the said gear 45 being, in turn, designed to mesh with the gear 44 which drives the sprocket 35.

In cameras of the character herein described, it is known that when the film F is first rewound on the empty spool, the core diameter is small, and that as the convolutions of film are received on the core 21, the core diameter becomes larger. It is therefore necessary to introduce a friction slipping device at some point in the chain of gearing between the sprocket 35 and the spool 20.

By our invention, as above described, we have eliminated this friction gearing inside the camera, and have provided an improved construction whereby we obtain a fixed gear ratio which permits of no slipping action up to the point of engaging the spool. In our construction, the spool itself is equipped with a friction gear 25 which forms the last point in the chain of gearing when the spool is mounted in the film spool chamber 15.

As clearly shown in Figs. 1, 3 and 4 of the drawing, and as hereinbefore described, the flange 22 is rotatable with respect to the core 21 and the gear 25 is fixedly attached to the flange 22. It is therefore seen that whenever the gear 25 is caused to be rotated by the chain of gearing in the camera leading up thereto, the said flange 22 will also rotate. In order to cause the flange 22 to rotate the core 21, there is provided a spring 62 fixed to the core extension 21a and which normally urges the flange 22 into frictional engagement with the shoulder 21b, and thus causes the film F to be rewound on the spool 20. As the core diameter of the spool 20 increases, there will be a slipping action between the flange 22 and the shoulder 21b to compensate for such increase.

For positioning or mounting the spool 20 in the film spool chamber 15 there is provided a centrally disposed opening 29 in the core extention 21a which is adapted to receive therein a shaft 30 fixedly attached to the wall W of the camera casing part 11. Projecting outwardly from the opposite flange 23 and centrally located with respect to the longitudinal axis of the spool 20, is a short shaft 31 which is adapted to be freely received in an open top bearing member 32. The said bearing 32 may be attached to, or may be die-cast as an integral part of, the casing wall Z. When it is desired to mount the spool in the chamber 15, it is merely necessary to cause the shaft 30 to be received in the opening 29 and to simply drop the shaft 31 into the bearing 32.

While in the drawing we have illustrated our invention as applied to cameras of the so-called "candid" type, it is understood that our invention may be used in the construction of other similar types of cameras. The gear 25 may be designed with a relatively large number of teeth so as to substantially always be directly in mesh with the camera driving gear 45 when the spool 20 is positioned in the film chamber 15 as above described. By this construction it will be unnecessary to turn or adjust the same into proper alignment for mounting the spool in the camera.

It is thus seen from the above described construction that there has been provided a film spool construction which includes a friction slipping member so that uniform take-up or re-winding of the film on said spool is insured as the core diameter of the spool increases due to the convolutions of film being wound thereon. It is also seen that the film spool constructed in accordance with our invention is adapted to be effectively used in combination with a non-slipping spool driving mechanism mounted in a camera, since our improved film spool itself carries the slipping mechanism, thereby greatly reducing the number of times that the friction member is used, since a new friction member may be introduced into the camera with each new roll of film.

Also, it is noted that since the friction slipping member is removable with the spool, it may therefore be readily inspected.

In Figs. 5 and 6, there is illustrated a modified form of our invention in which the film spool comprises a core 65 and a pair of flanges 66 and 67 attached thereto in any suitable manner. One of the flanges such as, for example, the flange 66 is provided with a centrally disposed extension 68 on which there is adapted to be mounted a clutch member 69 having projecting portions 70 which are adapted to cooperate with a pair of driving slots 71 mounted on a gear member 72 so that the said gear 72 and the clutch 69, when in operative position, will rotate as a unit. The clutch 69 is designed to be rotatable with respect to the extension 68 and is held captive on said extension by means of a washer member 73 fixed to the extension 68 so that the clutch 69 is positioned between the washer 73 and the flange 66. A spring member 74 surrounding the extension 68 is interposed between the flange 66 and the clutch 69 so as to normally urge the said clutch into frictional engagement with the washer 73. It is thus seen that when the gear 72 is rotated and the clutch projections 70 are received in the driving slots 71, the core 65 will be caused to rotate due to the frictional action between the washer 73 and the clutch 69. When the core diameter of the film spool increases, there will be a compensating frictional slipping action between said washer 73 and said clutch 69. The gear 72, which is designed to mesh with the core 45 in the camera, may be designed so as to be carried by the spool by having a shaft 75 fixed to said gear and received in the opening 76 in the extension 68.

Any suitable means commonly known in the art may be employed for attaching the end of the film F to the core 21 or to the core 65.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. A camera film spool comprising a core and a pair of flanges, one of said flanges being rotatable relative to said core, a gear fixedly attached to said rotatable flange for rotation therewith, and a resilient member carried by said spool and adapted to urge the rotatable flange into frictional engagement with the core to rotate said core.

2. A film spool comprising a core, a pair of flanges, one of said flanges being rotatable relative to said core, a gear fixedly attached to said rotatable flange for rotation therewith, and resilient means for normally urging said rotatable flange into frictional engagement with said core to provide a friction slip drive between said gear and said core.

3. A film spool comprising a core, a pair of flanges, one of said flanges being rotatable relative to said core, a gear fixedly attached to said rotatable flange for rotation therewith, and resilient means for normally urging said rotatable flange into frictional engagement with said core to provide a friction slip drive between said gear and said core, said resilient means comprising a spring fixed to said core.

4. A film spool comprising a core and a flange, a driving gear member mounted on said spool, said driving member being rotatable relative to said core, and means for frictionally causing said driving member and said core to rotate together, said last named means including a spring interposed between said gear and said flange.

5. A film spool comprising a core and a flange, a driving gear member mounted on said spool, said driving member being rotatable relative to said core, and means for frictionally causing said driving member and said core to rotate together, said last named means including a spring fixed to said core and interposed between said gear and said flange.

GEORGE KENDE.
PHILIP J. BROWNSCOMBE.